United States Patent
Kobayashi et al.

(10) Patent No.: US 9,638,102 B2
(45) Date of Patent: May 2, 2017

(54) POWER GENERATION SYSTEM AND METHOD FOR STARTING POWER GENERATION SYSTEM

(71) Applicant: MITSUBISHI HITACHI POWER SYSTEMS, LTD., Yokohama-shi, Kanagawa (JP)

(72) Inventors: Yoshinori Kobayashi, Tokyo (JP); Kazuo Tomida, Tokyo (JP); Masayuki Fukagawa, Tokyo (JP); Ryutaro Mori, Tokyo (JP); Takeshi Kitamura, Hiroshima (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 385 days.

(21) Appl. No.: 14/260,803

(22) Filed: Apr. 24, 2014

(65) Prior Publication Data

US 2014/0318146 A1 Oct. 30, 2014

(30) Foreign Application Priority Data

Apr. 26, 2013 (JP) .................................. 2013-094703

(51) Int. Cl.
*F02C 7/22* (2006.01)
*F02C 6/10* (2006.01)
(Continued)

(52) U.S. Cl.
CPC ............... *F02C 6/08* (2013.01); *F01K 13/02* (2013.01); *F01K 23/101* (2013.01); *F02C 7/224* (2013.01);
(Continued)

(58) Field of Classification Search
CPC .... F02C 7/224; F02C 6/08; F02C 6/10; Y02E 60/56; Y02E 60/563; H01M 8/0411;
(Continued)

(56) References Cited

U.S. PATENT DOCUMENTS 3,972,731 A * 8/1976 Bloomfield ............... F02C 6/00
429/423
3,976,506 A * 8/1976 Landau ..................... F02C 6/00
429/414
(Continued)

FOREIGN PATENT DOCUMENTS

JP 7-267604 A 10/1995
JP 2004-220941 A 8/2004
(Continued)

OTHER PUBLICATIONS

Office Action dated Feb. 7, 2017, issued in counterpart Japanese Application No. 2013-094703, with English translation (5 pages).

*Primary Examiner* — Phutthiwat Wongwian
*Assistant Examiner* — Rene Ford
(74) *Attorney, Agent, or Firm* — Westerman, Hattori, Daniels & Adrian, LLP

(57) ABSTRACT

A gas turbine includes a compressor and a combustor; a SOFC having a cathode and an anode; a first compression air supply line supplying compression air to the combustor; a second compression air supply line supplying compression air to the cathode; an exhaust air supply line supplying exhaust air discharged from the cathode to the combustor; a first fuel gas supply line supplying a fuel gas to the combustor; a second fuel gas supply line supplying a fuel gas to the anode; a fuel gas supply ratio change unit capable of changing a supply ratio of the fuel gas supplied to the combustor and the fuel gas supplied to the anode; an exhaust fuel gas supply line supplying an exhaust fuel gas discharged from the anode to the combustor; and a controller performing open-close control of the control valves and according to an operation state of the SOFC.

3 Claims, 5 Drawing Sheets

(51) Int. Cl.
*H01M 8/04* (2016.01)
*F02C 6/08* (2006.01)
*F01K 23/10* (2006.01)
*H01M 8/04111* (2016.01)
*F02C 7/224* (2006.01)
*H01M 8/0662* (2016.01)
*H01M 8/0432* (2016.01)
*H01M 8/04746* (2016.01)
*F01K 13/02* (2006.01)
*H01M 8/124* (2016.01)

(52) U.S. Cl.
CPC ...... *H01M 8/0432* (2013.01); *H01M 8/04111* (2013.01); *H01M 8/04753* (2013.01); *H01M 8/0662* (2013.01); *F02C 6/10* (2013.01); H01M 2008/1293 (2013.01); H01M 2250/407 (2013.01); Y02E 20/16 (2013.01); Y02E 60/50 (2013.01); Y02E 60/525 (2013.01); Y02E 60/56 (2013.01); Y02E 60/563 (2013.01); Y02P 70/56 (2015.11)

(58) Field of Classification Search
CPC ......... H01M 8/04225; H01M 8/04302; H01M 8/04313–8/04716; H01M 2250/407
See application file for complete search history.

(56) References Cited

U.S. PATENT DOCUMENTS

| | | | | |
|---|---|---|---|---|
| 4,004,947 A * | 1/1977 | Bloomfield | ............... | F02C 6/00 429/416 |
| 5,083,425 A * | 1/1992 | Hendriks | ................. | F02C 3/36 60/39.183 |
| 5,541,014 A * | 7/1996 | Micheli | ............. | H01M 8/04089 429/415 |
| 5,678,647 A * | 10/1997 | Wolfe | ................. | B60L 11/1881 429/430 |
| 5,968,680 A * | 10/1999 | Wolfe | ................. | B60L 11/1881 429/425 |
| 2002/0174659 A1* | 11/2002 | Viteri | ................ | H01M 8/04022 60/780 |
| 2004/0121199 A1* | 6/2004 | Balan | ................ | H01M 8/04022 429/415 |
| 2004/0121207 A1* | 6/2004 | Bunker | ............. | H01M 8/04007 429/415 |
| 2004/0124308 A1* | 7/2004 | Daggett | ................. | B64D 41/00 244/58 |
| 2005/0196659 A1* | 9/2005 | Grieve | ...................... | F02C 1/05 429/415 |
| 2006/0046114 A1* | 3/2006 | Kato | ...................... | C01B 3/384 429/423 |
| 2013/0221675 A1* | 8/2013 | Ozawa | ...................... | F02C 3/28 290/54 |
| 2013/0316255 A1* | 11/2013 | Bozzolo | ............ | H01M 8/04022 429/415 |
| 2014/0202167 A1* | 7/2014 | Mori | ......................... | F02C 3/20 60/793 |
| 2014/0230450 A1* | 8/2014 | Ozawa | ...................... | F02C 9/40 60/780 |
| 2015/0260097 A1* | 9/2015 | Fujita | ................. | H01M 8/0662 60/772 |

FOREIGN PATENT DOCUMENTS

| | | |
|---|---|---|
| JP | 2009-187755 A | 8/2009 |
| JP | 2009-187756 A | 8/2009 |
| JP | 2009-205932 A | 9/2009 |
| JP | 4450623 B2 | 4/2010 |

\* cited by examiner

POWER GENERATION SYSTEM AND METHOD FOR STARTING POWER GENERATION SYSTEM

FIELD

The present invention relates to a power generation system and a method for starting the power generation system in which a fuel cell, a gas turbine, and a steam turbine are combined.

BACKGROUND

A solid oxide fuel cell (SOFC) is known as a versatile and highly efficient fuel cell. Since the SOFC has a high operation temperature in order to increase ion conductivity, it is possible to use air discharged from a compressor of a gas turbine as air supplied to a cathode (oxidant). Also, it is possible to use high-temperature fuel and exhausted heat which are unused in SOFC, as a fuel and an oxidant in a combustor of the gas turbine. Besides the SOFC, a molten carbonate fuel cell is known as a fuel cell having a high operation temperature. Similar to the SOFC, use of the exhausted heat in link with the gas turbine is considered.

Therefore, for example, as described in the following Patent Literature 1, as a power generation system capable of achieving high efficiency power generation, there have been proposed various types combining the SOFC, the gas turbine, and the steam turbine. The combined system described in Patent Literature 1 is provided with the SOFC and the gas turbine having a gas turbine combustor, which combusts exhaust fuel gas and exhaust air discharged from this SOFC, and a compressor, which compresses air and supplies it to the SOFC. As a system with which maximum power generation efficiency can be obtained, there is the system described in Patent Literature 2. With this system according to Patent Literature 2, it is described that, by decreasing a utilization rate of a raw fuel gas of the solid oxide fuel cell to 65 to 80%, a hydrogen concentration in the vicinity of an exit portion of the solid oxide fuel cell is increased, and power generation performances are improved.

CITATION LIST

Patent Literature

Patent Literature 1: Japanese Laid-open Patent Publication No. 2009-205932
Patent Literature 2: Japanese Patent No. 4450623

SUMMARY OF THE INVENTION

Technical Problem

In the above-described conventional power generation system, since a power generation temperature of a fuel cell is high, a heat balance in the power generation system is maintained to be appropriate by an flow rate of fuel supply and an flow rate of air supply to a fuel cell, or heat exchange in a gas supply line of the fuel cell, and temperature control of the fuel cell is performed by controlling the flow rate of air supply to the fuel cell. Therefore, exhaust (exhaust air) discharged from the SOFC has a high temperature, and the exhaust air reaches up to about 650° C. during rated operation. Therefore, it is necessary to design an exhaust air line (piping), which feeds the exhaust air to a gas turbine combustor, by using a piping material and a piping thickness that can withstand an expected temperature exceeding a temperature during the rated operation. There is a problem in that the piping material capable of withstanding this expected temperature is very expensive, whereby a manufacturing cost is increased if this piping material is used for a very large piping thickness.

The present invention aims at solving the above-described problem, and an objective thereof is to provide a power generation system, in which a manufacturing cost of an exhaust oxidant supply line is reduced by lowering a temperature of the exhaust oxidant discharged from a fuel cell, and a method for starting the power generation system.

Solution to Problem

According to an aspect of the present invention, a power generation system includes: a gas turbine having a compressor and a combustor; a fuel cell having a cathode and an anode; a first compression oxidant supply line configured to supply a compression oxidant compressed in the compressor to the combustor; a second compression oxidant supply line configured to supply at least a part of the compression oxidant compressed in the compressor to the cathode; an exhaust oxidant supply line configured to supply an exhaust oxidant discharged from the cathode to the combustor; a first fuel gas supply line configured to supply a fuel gas to the combustor; a second fuel gas supply line configured to supply the fuel gas to the anode; a fuel gas supply ratio change unit capable of changing a supply ratio between the fuel gas supplied to the combustor and the fuel gas supplied to the anode; an exhaust fuel gas supply line configured to supply an exhaust fuel gas discharged from the anode to the combustor; and a control unit configured to control the fuel gas supply ratio change unit in accordance with a temperature of the fuel cell. The fuel cell is provided with a power generation chamber temperature detector configured to detect a temperature of a power generation chamber of the fuel cell, and before the fuel cell completes start-up, the control unit performs control of decreasing a fuel gas flow rate supplied to the combustor by ΔL and of increasing a fuel gas flow rate supplied to the anode by ΔL by the fuel gas supply ratio change unit.

Therefore, in a process in which the fuel cell reaches a state of rated operation, supply ratios of a fuel gas supplied to the combustor of the gas turbine and a fuel gas supplied to the anode of the fuel cell are changed such that much fuel gas can be supplied so as to lower a fuel utilization rate of the fuel cell. Accordingly, it is possible to decrease the temperature of the exhaust oxidant by an endothermic effect due to internal reforming of the fuel gas and by an increase of a heat amount of the exhaust fuel gas in the fuel cell. Accordingly, it is possible to set a heat resistant temperature of the exhaust oxidant supply line to be low, whereby the manufacturing cost can be decreased.

Advantageously, in the power generation system includes: a steam supply line configured to supply steam to the anode; and a steam supply flow rate adjusting unit configured to adjust a supply flow rate of the steam supplied to the anode. The steam supply flow rate adjusting unit increases the supply flow rate of the steam supplied to the anode, before the control of increasing the fuel gas flow rate supplied to the anode by ΔL is completed.

Therefore, in order to increase the steam supply flow rate supplied to the anode before a control for increasing the fuel gas flow rate supplied to the anode by ΔL is completed, the fuel gas is appropriately reformed by the steam, whereby it is possible to maintain a reducing atmosphere on the anode side.

Advantageously, in the power generation system further includes an exhausted heat recovery boiler configured to generate steam from a flue gas from the gas turbine. The steam supply line is connected to the exhausted heat recovery boiler at one end thereof, and connected to the anode at the other end thereof.

Therefore, by making it possible to supply the steam, generated in the exhausted heat recovery boiler within the system, to the anode of the fuel cell, it is not necessary to provide a separate steam generator, whereby an equipment cost can be decreased.

According to another aspect of the present invention, a method for starting a power generation system includes: supplying a compression oxidant compressed in a compressor to a combustor of a gas turbine; supplying a fuel gas to the combustor; supplying a part of the compression oxidant compressed in the compressor to an cathode of a fuel cell; supplying the fuel gas to a anode of the fuel cell; supplying an exhaust oxidant discharged from the cathode to the combustor; supplying an exhaust fuel gas discharged from the anode to the combustor; decreasing a fuel gas flow rate supplied to the combustor and increasing a fuel gas flow rate supplied to the anode, when a temperature of the power generation chamber reaches a predetermined temperature set in advance.

Therefore, in a process in which the fuel cell reaches the state of the rated operation, supply ratios of the fuel gas supplied to the combustor of the gas turbine and the fuel gas supplied to the anode of the fuel cell are changed such that much fuel gas can be supplied so as to lower the fuel utilization rate of the fuel cell. Accordingly, it is possible to decrease the temperature of the exhaust oxidant by an endothermic effect due to internal reforming of the fuel gas and by an increase of a heat amount of the exhaust fuel gas in the fuel cell. Accordingly, it is possible to set the heat resistant temperature of the exhaust oxidant supply line to be low, whereby the manufacturing cost can be decreased.

Advantageously, in the method for starting the power generation system, a decrement of the fuel gas flow rate supplied to the combustor and an increment of the fuel gas flow rate supplied to the anode are set to be equal.

Therefore, it is possible to surely secure a fuel gas flow rate necessary in the fuel cell and the combustor of the gas turbine.

Advantageous Effects of Invention

In a power generation system and a method for starting the power generation system according to the present invention, in a process in which a fuel cell reaches a state of rated operation, a supply ratio between a fuel gas supplied to a combustor of a gas turbine and a fuel gas supplied to an anode of the fuel cell is changed so as to enable supplying much fuel gas such that a fuel utilization rate of the fuel cell is decreased. Accordingly, it is possible to decrease the temperature of the exhaust oxidant by an endothermic effect due to an internal reforming of the fuel gas and by an increase of a heat amount of the exhaust fuel gas in the fuel cell. Accordingly, it is possible to set a heat resistant temperature of the exhaust oxidant supply line to be low, whereby the manufacturing cost can be decreased. Furthermore, it is possible to operate the fuel cell with a fuel utilization rate lower than before, or in a state where the reducing atmosphere in the anode is stable, whereby it is possible to realize performance improvement and robustness improvement of the fuel cell.

DESCRIPTION OF EMBODIMENTS

Preferred embodiments of a power generation system and a method for starting the power generation system according to the present invention are described in detail below with reference to the attached drawings. Note that the present invention is not to be limited by these embodiments. In a case where there are multiple embodiments, it may also include an embodiment constituted by combining each of the embodiments.

Embodiment

The power generation system according to a first embodiment is a triple combined cycle (registered trademark) in which a solid oxide fuel cell (hereafter, referred to as SOFC), a gas turbine, and a steam turbine are combined. In the triple combined cycle, by installing the SOFC on an upstream side of a gas turbine combined cycle power generation (GTCC), electricity can be taken out in three stages of the SOFC, the gas turbine, and the steam turbine, whereby very high power generation efficiency can be realized. Note that in a description below, a solid oxide fuel cell is applied as a fuel cell according to the present invention; however, it is not to be limited to a fuel cell of this type.

Figure 1:
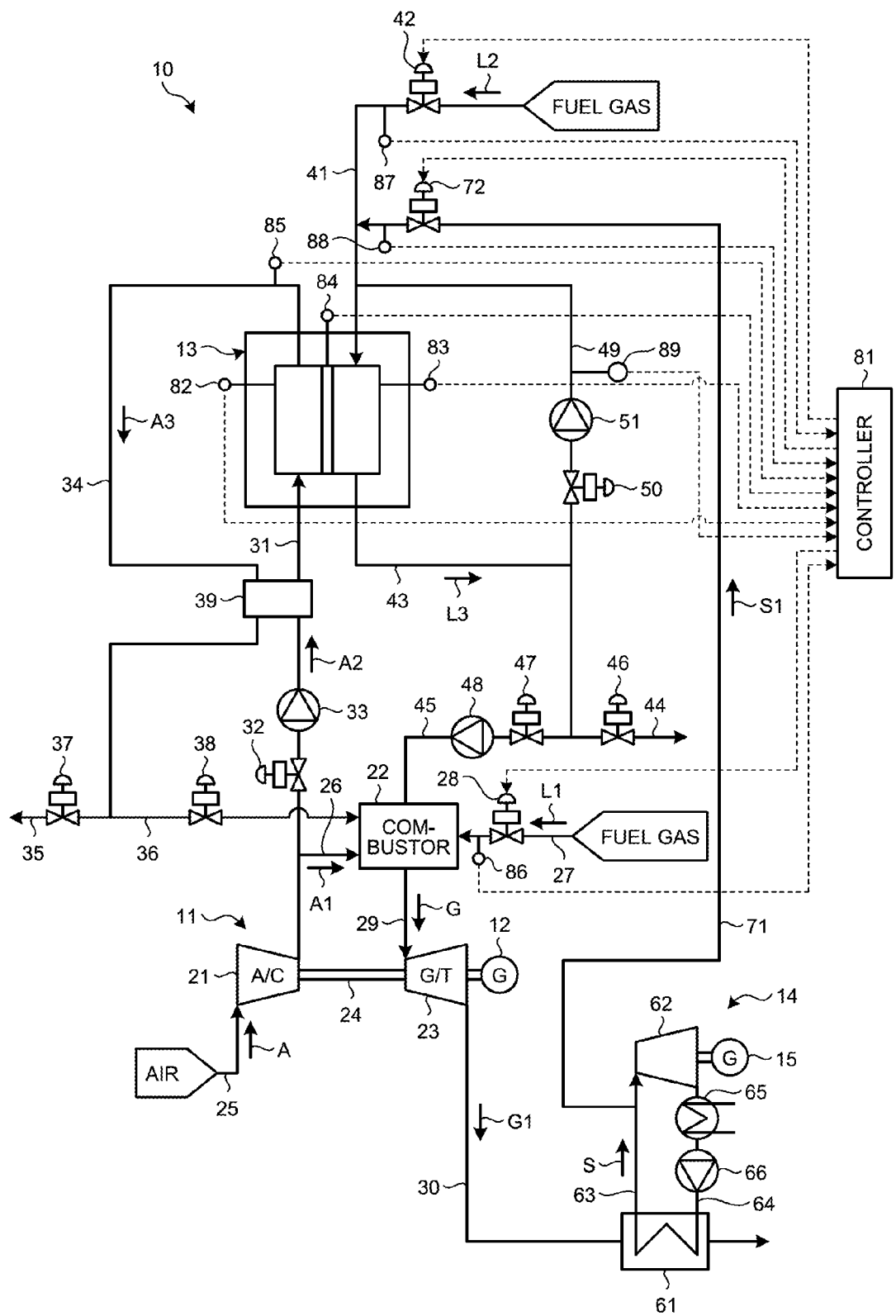
FIG. 1 is a schematic configuration diagram illustrating a power generation system according to one embodiment of the present invention.
Figure 2:
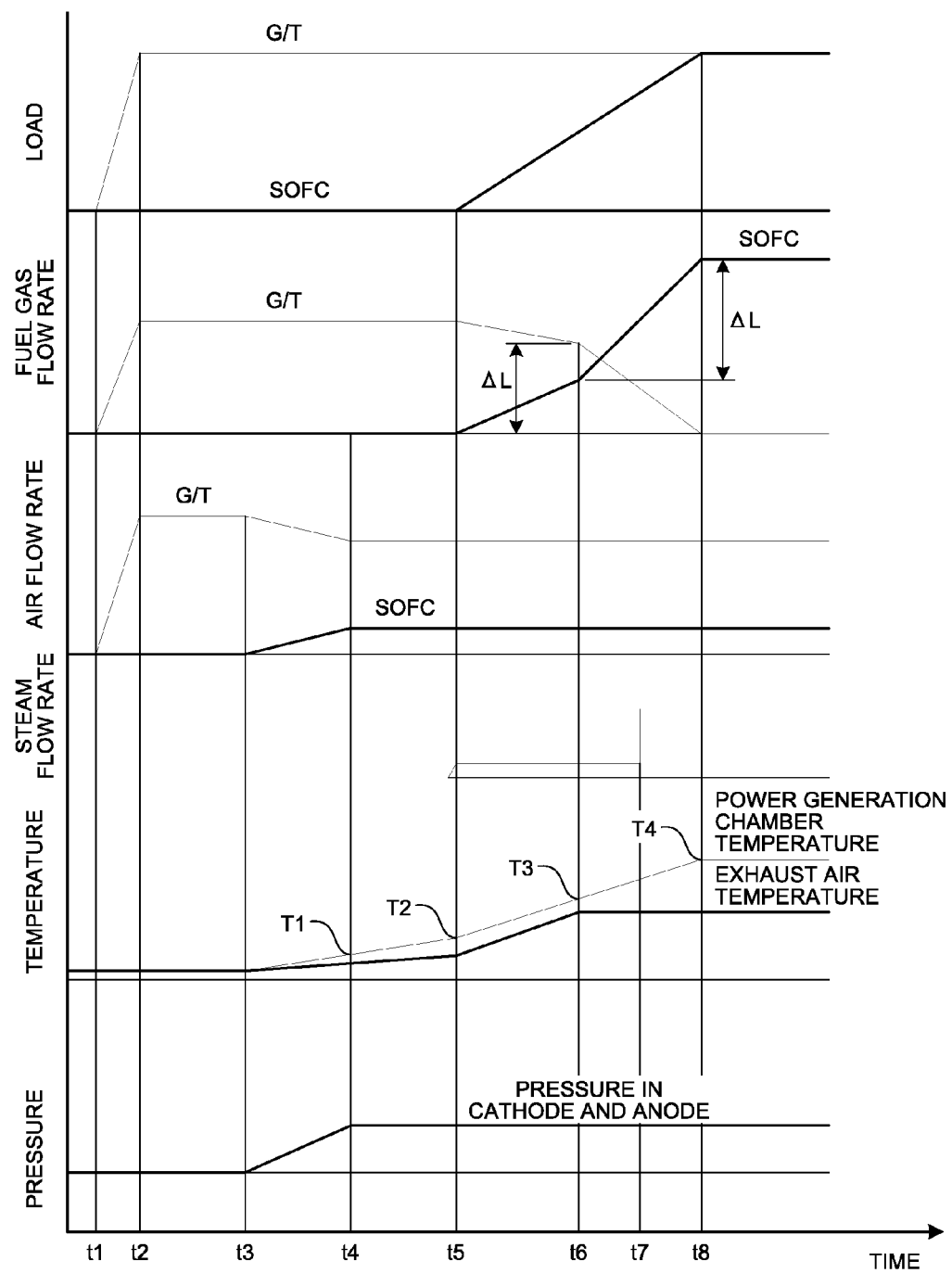
FIG. 2 is time chart illustrating a method for starting the power generation system according to the embodiment.
Figure 3:
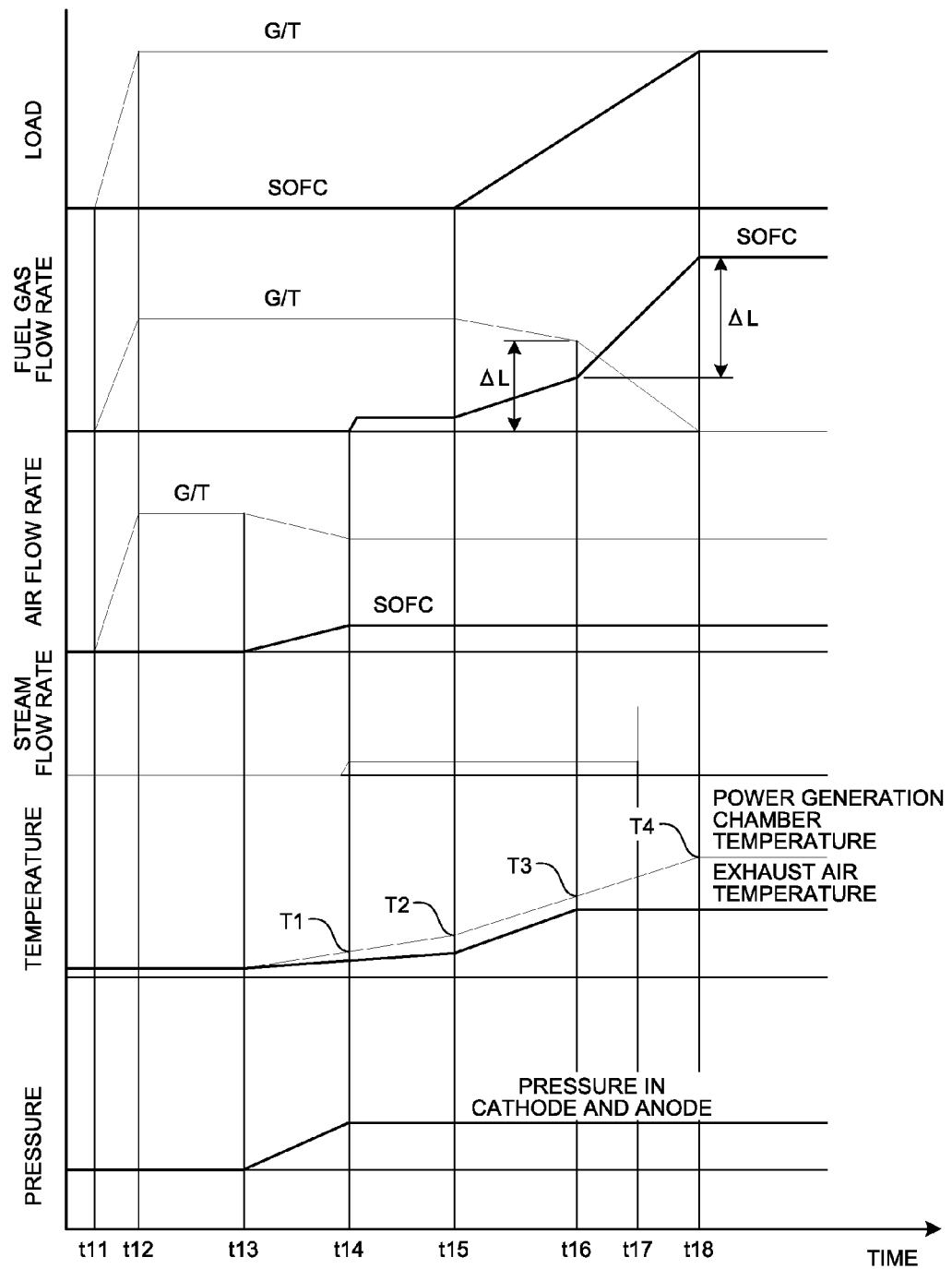
FIG. 3 is time chart illustrating the method for starting the power generation system according to a modification of the embodiment.
Figure 4:
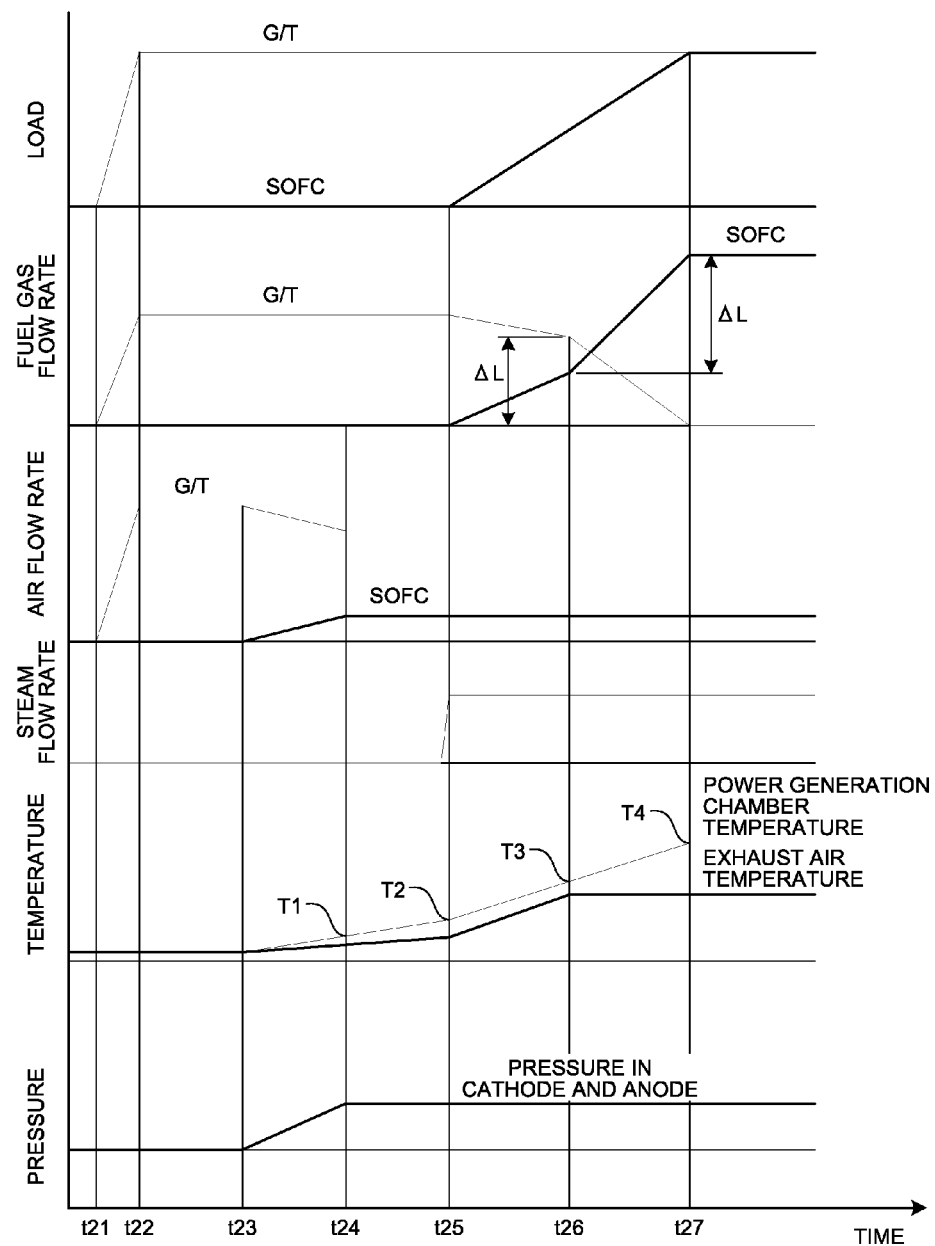
FIG. 4 is time chart illustrating the method for starting the power generation system according to a modification of the embodiment.
Figure 5:
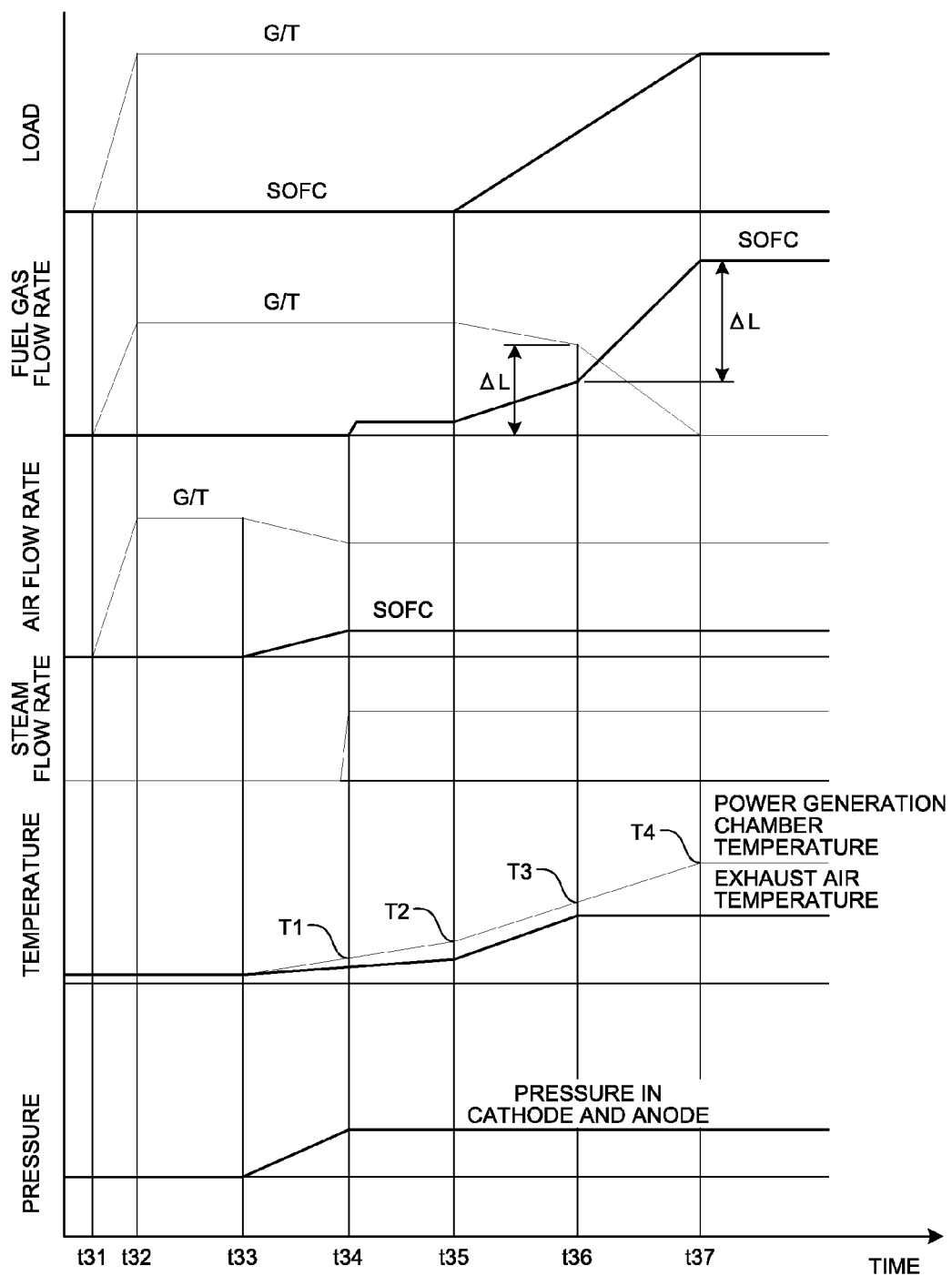
FIG. 5 is time chart illustrating a method for starting the power generation system according to a modification of the embodiment.

FIG. 1 is a schematic configuration diagram illustrating the power generation system according to one embodiment of the present invention, FIG. 2 is time chart illustrating a method for starting the power generation system according to the embodiment, and FIGS. 3 to 5 are time charts illustrating the method for starting the power generation system according to modifications of this embodiment.

In the embodiment, as illustrated in FIG. 1, a power generation system 10 includes a gas turbine 11, a power generator (G) 12, a SOFC 13, a steam turbine 14, and a power generator (G) 15. The power generation system 10 is configured to obtain high power generation efficiency by combining power generation by the gas turbine 11, power generation by the SOFC 13, and power generation by the steam turbine 14.

The gas turbine 11 includes a compressor (A/C) 21, a combustor 22, and a turbine (G/T) 23. The compressor 21 and the turbine 23 are integrally-rotatably connected with each other by a rotating shaft 24. The compressor 21 compresses air (oxidant) A taken in from an air intake line 25. The combustor 22 mixes compression air (compression oxidant) A1 which is supplied from the compressor 21 through a first compression air supply line (first compression oxidant supply line) 26, with a fuel gas L1 which is supplied from a first fuel gas supply line 27, and combusts it. The first fuel gas supply line 27 is provided with a control valve 28 which can adjust a supply flow rate of the fuel gas L1, and a first fuel gas supply line flow meter 86 which detects a flow rate of the first fuel gas supply line 27. The turbine 23 is rotated by a flue gas (combustion gas) G supplied from the combustor 22 through a flue gas supply line 29. Note that, although not illustrated, a compression air A1 compressed by the compressor 21 is supplied to the turbine 23 through a casing, and a blade and the like are cooled by using the compression air A1 as cooling air. The power generator 12 is provided on the same shaft as the turbine 23, and power can be generated by the turbine 23 being rotated.

Note that here, as the fuel gas L1 supplied to the combustor 22, it is possible to use, for example, a liquefied natural gas (LNG), hydrogen ($H_2$) or carbon monoxide (CO), a hydrocarbon gas such as methane ($CH_4$), and a gas manufactured by a gasification equipment of a carbonaceous raw material such as coal.

The SOFC 13, to which a high temperature fuel gas is supplied as a reductant and high temperature air (oxidant) is supplied as an oxidant, performs power generation by reacting them in a predetermined operation temperature. The SOFC 13 is configured to house a cathode, a solid electrolyte, and an anode inside a pressure vessel. To the cathode, a part of a compression air (compression oxidant) A2 compressed in the compressor 21 is supplied, and to the anode, a fuel gas L2 is supplied, whereby power generation is performed.

Note that here, as the fuel gas L2 supplied to the SOFC 13, it is possible to use, for example, a liquefied natural gas (LNG), hydrogen ($H_2$) or carbon monoxide (CO), a hydrocarbon gas such as methane ($CH_4$), and a gas manufactured by a gasification equipment of a carbonaceous raw material such as coal, whereby a gas of the same type as the fuel gas L1 supplied to the combustor 22 may be used. Furthermore, the oxidant supplied to the SOFC 13 is a gas containing substantially 15% to 30% of oxygen, and typically air is preferred; however, besides the air, a mixed gas of a combustion flue gas and the air, or a mixed gas of the oxygen and the air can also be used (hereafter, the oxidant supplied to the SOFC 13 is referred to as the air).

The SOFC 13 is connected to a second compression air supply line (second compression oxidant supply line) 31, which is branched from the first compression air supply line 26, and is capable of supplying a part of the compression air A2 compressed by the compressor 21 to an inlet portion of the cathode. The second compression air supply line 31 is provided with a control valve 32 which can adjust a supply flow rate of the compression air A2, and a blower (oxidant booster) 33 which can pressurize the compression air A2, along a flow direction of the air. The control valve 32 is provided on an upstream side in the flow direction of the air in the second compression air supply line 31, and the blower 33 is provided on a downstream side of the control valve 32. Note that arrangement of the control valve 32 and the blower (booster) 33 is not to be limited to the arrangement in FIG. 1, and an order thereof may be reversed in accordance with a type of the blower (booster) and the control valve.

The SOFC 13 is connected to an exhaust air line 34, through which exhaust air (exhaust oxidant) A3 used in the cathode is discharged. The exhaust air line (exhaust oxidant line) 34 is branched into a discharge line 35 which discharges the exhaust air A3 used in the cathode to the outside, and an exhaust air supply line (exhaust oxidant supply line) 36 connected to the combustor 22. The discharge line 35 is provided with a control valve 37 which can adjust a discharge flow rate of the exhaust air A3, and the exhaust air supply line 36 is provided with a control valve 38 which can adjust a circulation flow rate of the exhaust air A3. A heat exchanger 39 is provided between the second compression air supply line 31 and the exhaust air line 34. The heat exchanger 39 performs heat exchange between the compression air A2 and the exhaust air A3, and the compression air A2 is heated by the exhaust air A3.

The SOFC 13 is provided with a second fuel gas supply line 41 which supplies the fuel gas L2 to an inlet portion of the anode. The second fuel gas supply line 41 is provided with a control valve 42 which can adjust a supply flow rate of the fuel gas L2, and with a second fuel gas supply line flow meter 87 which detects a flow rate of the second fuel gas supply line 41. The SOFC 13 is connected to an exhaust fuel line 43 which discharges an exhaust fuel gas L3 used in the anode. The exhaust fuel line 43 is branched into a discharge line 44 for discharging to the outside and an exhaust fuel gas supply line 45 connected to the combustor 22. The discharge line 44 is provided with a control valve 46 which can adjust a discharge flow rate of the exhaust fuel gas L3. The exhaust fuel gas supply line 45 is provided with a control valve 47 which can adjust a supply flow rate of the exhaust fuel gas L3, and a blower (exhaust fuel gas booster) 48 which can pressurize the exhaust fuel gas L3, along a flow direction of the exhaust fuel gas L3. The control valve 47 is provided on an upstream side in the flow direction of the exhaust fuel gas L3 in the exhaust fuel gas supply line 45, and the blower 48 is provided on a downstream side of the control valve 47 in the flow direction of the exhaust fuel gas L3. Note that arrangement of the control valve 47 and the blower (booster) 48 is not to be limited to the arrangement in FIG. 1, and order thereof may be reversed in accordance with a type of the blower (booster) and the control valve.

The SOFC 13 is provided with a fuel gas recirculation line 49 which connects the exhaust fuel line 43 with the second fuel gas supply line 41. The fuel gas recirculation line 49 is provided with a control valve 50 which can adjust a recirculation flow rate of the exhaust fuel gas L3, a fuel gas recirculation line flow meter 89 which detects a flow rate of the fuel gas recirculation line 49, and a blower 51 which recirculates the exhaust fuel gas L3 into the second fuel gas supply line 41. The control valve 50 is provided on an upstream side in the flow direction of the exhaust fuel gas L3 in the fuel gas recirculation line 49, and the blower 51 is provided on a downstream side of the control valve 50 in the flow direction of the exhaust fuel gas L3.

The steam turbine 14 rotates a turbine 62 by steam generated by an exhausted heat recovery boiler (HRSG) 61. The exhausted heat recovery boiler 61 is connected to a flue gas line 30 from the gas turbine 11 (turbine 23), and generates steam (vapor) S by performing heat exchange between air and a high temperature flue gas G1. The steam turbine 14 (turbine 62) is provided with a steam supply line 63 and a water supply line 64, which are placed between the exhausted heat recovery boiler 61 and the turbine 62. Then, the water supply line 64 is provided with a condenser 65 and a water supply pump 66. The power generator 15 is provided on the same shaft as the turbine 62, and power can be generated by the turbine 62 being rotated. Note that the flue gas G1, from which heat is recovered in the exhausted heat recovery boiler 61, is emitted to the atmosphere after a toxic substance is removed. Note that in this embodiment, the flue as G1 is used as a heat source for the exhausted heat recovery boiler 61; however, the flue gas G1 can also be used as the heat source for various devices other than the exhausted heat recovery boiler 61.

The exhausted heat recovery boiler 61 is provided with a steam supply line 71, which is branched from the steam supply line 63. The steam supply line 71 is connected to the second fuel gas supply line 41 of the SOFC 13. The steam supply line 71 can supply a part of steam S1 generated in the exhausted heat recovery boiler 61 to the inlet portion of the anode. The steam supply line 71 is provided with a control valve (steam supply flow rate adjusting unit) 72, which can adjust a supply flow rate of the steam S1, and a steam supply line flow meter 88, which detects a flow rate of the steam supply line 71.

Here, general operation of the power generation system 10 according to this embodiment is described. To start up the power generation system 10, first the gas turbine 11 is started, and then the steam turbine 14 and the SOFC 13 are started in order.

First, in the gas turbine 11, the compressor 21 compresses air A taken in from the air intake line 25, and supplies the compression air A1 from the first compression air supply line 26 to the combustor 22. The combustor 22 mixes the compression air A1 with the fuel gas L1 supplied from the first fuel gas supply line 27 and combusts it, and supplies an flue gas G that has been combusted into the turbine 23 from the flue gas supply line 29. The turbine 23 is rotated by the flue gas G, and the power generator 12 starts to generate power. Next, in the steam turbine 14, the turbine 62 is rotated by steam S generated by the exhausted heat recovery boiler 61, and accordingly, the power generator 15 starts to generate power.

In the SOFC 13, first, the compression air A2 is supplied to start to increase a pressure and to start heating. The control valve 37 of the discharge line 35 and the control valve 38 of the exhaust oxidant supply line 36 are closed, and in a state where the blower 33 of the second compression air supply line 31 is stopped or in a state where the blower 33 is operated, the control valve 32 is opened for a predetermined opening degree. Note that an opening degree adjustment for controlling pressurizing speed may be performed here. Then, a part of the compression air A2 compressed in the compressor 21 is supplied from the second compression air supply line 31 to the SOFC 13 side. Accordingly, pressure increases on the SOFC 13 side by the compression air A2 being supplied.

On the other hand, in the SOFC 13, pressurizing is started by supplying the fuel gas L and by supplying compression air (oxidant) from a branch of a compression air line, which is not illustrated, or an inert gas such as nitrogen to the anode side. The control valve 46 of the discharge line 44 and the control valve 47 of the exhaust fuel gas supply line 45 are closed, and in a state where the blower 48 is stopped, the control valve 42 of the second fuel gas supply line 41 is opened, and the control valve 50 of the fuel gas recirculation line 49 is opened while the blower 51 is driven. Note that the blower 51 may also be started before the pressure is applied on the anode side. Then, the fuel gas L2 is supplied from the second fuel gas supply line 41 to the SOFC 13 side while the exhaust fuel gas L3 is recirculated by the fuel gas recirculation line 49 from the exhaust fuel line 43. Accordingly, on the SOFC 13 side, the pressure is increased by the fuel gas L2 (or a compression air, an inert gas, and the like) being supplied.

Then, once pressure on the cathode of the SOFC 13 reaches pressure at an exit of the compressor 21 (pressure of the compression air A1 and A2), a supply flow rate of the compression air A2 to the SOFC 13 is controlled by the control valve 32, and when the blower 33 is not started, the blower 33 is started. At the same time, the control valve 38 is opened, and the exhaust air A3 from the SOFC 13 is supplied to the combustor 22 from the exhaust oxidant supply line 36. At this time, by also opening the control valve 37, it is also possible to discharge a part of the exhaust air A3 from the SOFC 13 through the discharge line 35. Furthermore, it is also possible to discharge the exhaust fuel gas L3 from the SOFC 13 through the discharge line 44 by opening the control valve 46. Then, the pressurizing of the SOFC 13 is completed once the pressure on the cathode of the SOFC 13 and the pressure on the anode side reach a target pressure.

At this time, in the SOFC 13, at a stage in which a temperature of a power generation chamber reaches a predetermined temperature for enabling an internal reforming, the steam S1 is supplied to the anode side. The control valve (steam supply flow rate adjusting unit) 72 of the steam supply line 71 is opened for a predetermined opening degree. Then, a part of the steam S1 generated in the exhausted heat recovery boiler 61 is supplied to the SOFC 13 side from the steam supply line 71. Accordingly, by the fuel gas L2 and the steam S1 being supplied to the anode of the SOFC 13, the fuel gas L2 is appropriately reformed by this steam S1, whereby it is possible to maintain a reducing atmosphere on the anode side.

Subsequently, once a pressure control in the SOFC 13 is stabilized, in a case where the control valve 37 is set to open, it is closed, while the control valve 38 is maintained to be in an open state. Therefore, the exhaust air A3 from the SOFC 13 is continued to be supplied to the combustor 22 through the exhaust oxidant supply line 36. Furthermore, when a component of the exhaust fuel gas L3 becomes a component that can be put into the combustor 22, the control valve 46 is closed while the control valve 47 is opened and the blower 48 is driven. Then, the exhaust fuel gas L3 from the SOFC 13 is supplied to the combustor 22 through the exhaust fuel gas supply line 45.

Here, all of power generation in the power generator 12 by driving the gas turbine 11, power generation in the SOFC 13, and power generation in the power generator 15 by driving the steam turbine 14 is performed, whereby the power generation system 10 reaches steady operation.

By the way, the above-described power generation system 10 according to this embodiment is started in order of the gas turbine 11, the steam turbine 14, and the SOFC 13. That is, when the gas turbine 11 is started, the combustor 22 mixes the compression air A1 with the fuel gas L1 and combusts it, and after it is increased up to a predetermined load, it reaches the rated operation. On the other hand, the SOFC 13, when started, supplies the compression air A2 to the cathode to pressurize and increase a temperature, and supplies the fuel gas L2, which is of the same type as the fuel gas L1, to the anode for pressurizing. Power generation is started when the cathode and the anode reach a predetermined pressure and a predetermined temperature.

In this case, the SOFC 13, when the operation from start of the power generation is continued with the fuel supply in accordance with a high fuel utilization rate (for example, about 80 to 85%), the exhaust air A3 discharged to the exhaust air line 34 has a high temperature, and reaches about 650° C. during the rated operation. Therefore, it is necessary to design the exhaust air line 34 for the exhaust air A3 by using a piping material and a piping thickness that can withstand an expected temperature exceeding a temperature during the rated operation, whereby a manufacturing cost may be increased.

Therefore, the power generation system 10 according to this embodiment is provided with the control valves 28 and 42, as fuel gas supply ratio change units, which can change the supply ratio between the fuel gas L1 supplied to the combustor 22 and the fuel gas L2 supplied to the anode of the SOFC 13, and also with a controller (control unit) 81 that controls opening and closing of the control valves 28 and 42 according to a temperature in a power generation chamber of the SOFC 13. In this case, the control valves 28 and 42 are flow rate adjustment valves capable of adjusting an opening degree thereof.

The SOFC 13 is provided with a first pressure detector 82, which detects pressure of the cathode, and a second pressure detector 83, which detects pressure of the anode. Each of the pressure detectors 82 and 83 outputs a detection result to the controller 81. Furthermore, the SOFC 13 is provided with a power generation chamber temperature detector 84, which detects a temperature of the power generation chamber. The power generation chamber temperature detector 84 outputs a detection result to the controller 81. Furthermore, the SOFC 13 is provided with an exhaust air temperature detector 85, which detects a temperature of the exhaust air A3 discharged to the exhaust air line 34. The exhaust air temperature detector 85 outputs the detected result to the controller 81. In the first fuel gas supply line 27, the first fuel gas supply line flow meter 86 outputs a detection result to the controller 81. In the second fuel gas supply line 41, the second fuel gas supply line flow meter 87 outputs a detection result to the controller 81. In the steam supply line 71, the steam supply line flow meter 88 outputs a detection result to the controller 81.

The controller 81, when the temperature of the power generation chamber reaches a predetermined temperature set in advance, decreases the supply flow rate of the fuel gas L1 supplied to the combustor 22 by decreasing an opening degree of the control valve 28. On the other hand, it increases the supply flow rate of the fuel gas L2 supplied to the anode by increasing an opening degree of the control valve 42. Note that in order to make a total flow rate of the supply flow rate of the fuel gas L1 supplied to the combustor 22 and the supply flow rate of the fuel gas L2 supplied to the anode always fixed, the controller 81 may adjust the opening degree of the control valve 28 and the control valve 42 in accordance with a detection result of the first fuel gas supply line flow meter 86 and a detection result of the second fuel gas supply line flow meter 87. Here, a predetermined power generation chamber temperature T1 is a temperature (lower limit value) in which the SOFC 13 can reform the fuel gas L2 by being supplied with the fuel gas L2 and the steam S1.

Furthermore, the controller 81, when the temperature of the power generation chamber reaches a predetermined power generation chamber temperature T2 set in advance, decreases the supply flow rate of the fuel gas L1 supplied to the combustor 22 by decreasing the opening degree of the control valve 28. On the other hand, it increases the supply flow rate of the fuel gas L2 supplied to the anode by increasing the opening degree of the control valve 42. Note that in order to make a total flow rate of the supply flow rate of the fuel gas L1 supplied to the combustor 22 and the supply flow rate of the fuel gas L2 supplied to the anode always fixed, the controller 81 may adjust the opening degree of the control valve 28 and the control valve 42 in accordance with the detection result of the first fuel gas supply line flow meter 86 and the detection result of the second fuel gas supply line flow meter 87. Here, the predetermined power generation chamber temperature T2 is a temperature (lower limit value) in which the SOFC 13 can generate power by reaction of the compression air A2 and the fuel gas L2.

When the temperature of the power generation chamber reaches a predetermined power generation chamber temperature T3 set in advance, the controller 81 eventually sets the supply flow rate of the fuel gas L1 supplied to the combustor 22 to 0% by closing (fully closing) the control valve 28, while sets the supply flow rate of the fuel gas L2 supplied to the anode to 100% by opening (fully opening) the control valve 42. Here, 100% of the supply flow rate of the fuel gas L2 means a whole flow rate of the total flow rate of a fuel gas flow rate required by the combustor 22 of the gas turbine 11 and a fuel gas flow rate required by the anode of the SOFC 13. Here, the predetermined power generation chamber temperature T3 is an upper limit value of a heat resistant temperature of an exhaust air piping constituting the exhaust air line 34.

That is, the controller 81 adjusts the opening degree of a control valve (steam supply flow rate adjusting unit) 72 in accordance with the detection result of the second fuel gas supply line flow meter 87, the detection result of the steam supply line flow meter 88, and a detection result of the fuel gas recirculation line flow meter 89 such that a ratio of a total flow rate of a supply flow rate of the steam S1 relative to a carbon content within the supply flow rate of the fuel gas L2 supplied to the anode, and the recirculation flow rate of the exhaust fuel gas L3 is not less than a predetermined ratio, which is set in advance. Here, the predetermined ratio is based on a theoretical mixture ratio, or a steam to carbon (S/C) ratio, of the steam S1 to the carbon in the anode. It is calculated by using the following formula.

Theoretical mixture ratio (S/C ratio)=(supply flow rate of the steam S1+recirculation flow rate of the exhaust fuel gas L3)/carbon content within supply flow rate of fuel gas L2

Here, the supply flow rate of the steam S1 supplied to the anode is increased so as not to fall below the theoretical mixture ratio, or the S/C ratio=4.

Then, a method for starting the power generation system according to this embodiment includes: starting the gas turbine 11 by supplying the compression air A1 and the fuel gas L1 to the combustor 22 of the gas turbine 11; starting the SOFC 13 by supplying the compression air A2 and the fuel gas L2 to the SOFC 13; and when the temperature of the power generation chamber of the SOFC 13 reaches a predetermined temperature set in advance, decreasing the supply flow rate of the fuel gas L1 supplied to the combustor 22, and increasing the supply flow rate of the fuel gas L2 supplied to the SOFC 13.

Furthermore, the method for starting the power generation system according to this embodiment includes: supplying the compression air A1 compressed in the compressor 21 to the combustor 22 of the gas turbine 11; supplying the fuel gas L1 to the combustor 22; supplying a part of the compression air A2 compressed in the compressor 21 to the cathode of the SOFC 13; supplying the fuel gas L2 to the anode of the SOFC 13; supplying the exhaust air A3 discharged from the cathode to the combustor 22; supplying the exhaust fuel gas L3 discharged from the anode to the combustor 22; and when the temperature of the power generation chamber of the SOFC 13 reaches a predetermined temperature set in advance, decreasing the supply flow rate of the fuel gas L1 supplied to the combustor 22, and of increasing the supply flow rate of the fuel gas L2 supplied to the SOFC 13.

It further includes making a decrement of the fuel gas L1 supplied to the combustor 22 and an increment of the fuel gas L2 supplied to the SOFC 13 to be the same flow rate.

Hereafter, the method for starting the power generation system according to this embodiment is described in detail using the time chart in FIG. 2.

In the method for starting the power generation system according to this embodiment, as illustrated in FIGS. 1 and 2, at time t1, by starting supply of the compression air A1 and the fuel gas L1 to the combustor 22 of the gas turbine 11, the gas turbine 11 is started, and a load (output) thereof is increased. Then, at time t2, each of supply flow rates of the compression air A1 and the fuel gas L1 to the combustor 22 of the gas turbine 11 reaches a predetermined flow rate (fixed flow rate), whereby the load (output) of the gas turbine 11 becomes fixed, and it is in the rated operation.

At time t3, supply of the compression air A2 to the cathode of the SOFC 13 is started, and at time t4, the supply flow rate of the compression air A2 reaches a predetermined flow rate (fixed flow rate). Then, in the SOFC 13, pressure is increased in the cathode and the anode, as well as the temperature of the power generation chamber and the temperature of the exhaust air A3 are increased due to the supply of the compression air A2. At the time t3, corresponding to an increment of the compression air A2 supplied to the cathode of the SOFC 13, a supply flow rate of the compression air A1 supplied to the combustor 22 of the gas turbine 11 is decreased. At the time t4, the supply flow rate of the compression air A1 becomes a predetermined flow rate (fixed flow rate). In this case, a total flow rate of the supply flow rate of the compression air A2 to the cathode and the supply flow rate of the compression air A1 to the combustor 22 is always fixed; however, it is not limited to this case.

At time t5, a temperature of the power generation chamber of the SOFC 13 reaches a predetermined power generation chamber temperature T2, whereby supply of the fuel gas L2 to the anode of the SOFC 13 is started, and the supply flow rate of the fuel gas L2 is increased at a predetermined (fixed) rate of change. Then, in the SOFC 13, due to the supply of the fuel gas L2, the load (power generation flow rate) of the SOFC 13 is increased. Furthermore, at the time t5, corresponding to the increment of the fuel gas L2 supplied to the anode of the SOFC 13, the supply flow rate of the fuel gas L1 supplied to the combustor 22 of the gas turbine 11 is decreased, and at a predetermined (fixed) rate of change, the supply flow rate of the fuel gas L1 is decreased. In this case, the total flow rate of the supply flow rate of the fuel gas L2 to the anode and the supply flow rate of the fuel gas L1 to the combustor 22 is always fixed.

Furthermore, at the time t5, such that the supply flow rate of the steam S1 to the anode of the SOFC 13 becomes a predetermined value, supply of the steam S1 to the anode of the SOFC 13 is started before the time t5. Then, in the SOFC 13, by the supply of the steam S1 to the fuel gas L2, the fuel gas L2 is appropriately reformed by the steam S1.

At time t6, when the temperature of the power generation chamber reaches a predetermined power generation chamber temperature T3 set in advance, the supply flow rate of the fuel gas L2 to the anode of the SOFC 13 is further increased at a predetermined (fixed) rate of change, which is larger than the rate of change so far. Furthermore, at the time t6, corresponding to the increment of the fuel gas L2 supplied to the anode of the SOFC 13, the supply flow rate of the fuel gas L1 supplied to the combustor 22 of the gas turbine 11 is decreased at a predetermined (fixed) rate of change, which is larger than the rate of change so far. In this case, a total flow rate of the supply flow rate of the fuel gas L2 to the anode and the supply flow rate of the fuel gas L1 to the combustor 22 is always fixed.

Then, in the SOFC 13, by increasing the output thereof up to a rated power generation output, the temperature of the power generation chamber further increases due to exothermic reaction caused by the power generation; however, the temperature of the exhaust air A3 does not increase and becomes constant. That is, the SOFC 13 generates power with a low fuel utilization rate of the fuel gas L2 (30% to 60%) by supplying the fuel gas L2 more than the supply flow rate of the fuel gas L2 contributing to the power generation (reaction) relative to the supply flow rate of the compression air A2 supplied to the cathode. Then, a heat amount of the exhaust fuel gas L3 is increased as the supply flow rate of the fuel gas L2 is increased. Furthermore, in the SOFC 13, heat is used by an endothermic effect due to internal reforming of the fuel gas L2 in the SOFC 13. Accordingly, a heat self-supporting operation of the SOFC 13 is secured, and it becomes possible to decrease the temperature of the exhaust air A3 discharged to the exhaust air line 34 to conventional 620 to 650° C. or below.

At time t7, the control unit 81, based on the supply flow rates of the fuel gas L2 and the steam S1 supplied to the anode of the SOFC 13, increases the supply flow rate of the steam S1 supplied to the anode when it detects that the theoretical mixture ratio, or the S/C ratio, falls below 4. In FIG. 2, the supply flow rate of the steam S1 is set to be a supply flow rate capable of maintaining the theoretical mixture ratio S/C=4 or above based on the supply flow rate of the fuel gas L2 during the rated operation. Furthermore, by setting the supply flow rate of the steam S1 to a fixed value, it is possible to resolve fluctuation of the steam supply flow rate from a specified value caused by a change in the supply flow rate of the steam S1, and to stabilize starting of the fuel cell 13. In particular, since the supply flow rate of the steam S1 is known to fluctuate relative to the specified value, it is effective for securing the stability of the starting of the fuel cell 13. Furthermore, since the steam input flow rate is fixed, it is possible to simplify a device configuration of piping, a flow rate adjustment valve, and an on-off valve.

Then, at time t8 when the temperature of the power generation chamber reaches a predetermined power generation chamber temperature T4 set in advance, the controller 81 sets the supply flow rate of the fuel gas L2 supplied to the anode of the SOFC 13 to 100%, and sets the supply flow rate of the fuel gas L1 supplied to the combustor 22 to 0%. That is, a whole flow rate of the total flow rate of the supply flow rate of the fuel gas L1 required by the combustor 22 of the gas turbine 11 and the supply flow rate of the fuel gas L2 required by the anode of the SOFC 13 is supplied to the anode of the SOFC 13 as the fuel gas L2 (L1+L2). Here, the temperature of the power generation chamber of the SOFC 13 becomes fixed, and the load (power generation amount) of the SOFC 13 also becomes fixed. Here, the predetermined power generation chamber temperature T4 means a set temperature at which the SOFC 13 becomes operable in a rated state, and for a SOFC operable in a high temperature range, it is 800 to 1000° C.

Note that when the whole flow rate of the total flow rate of the supply flow rate of the fuel gas L1 required by the combustor 22 of the gas turbine 11 and the supply flow rate of the fuel gas L2 required by the anode of the SOFC 13 is supplied to the anode of the SOFC 13, an excessive fuel gas L2 not contributing to the power generation (reaction) is supplied to the combustor 22 of the gas turbine 11 through the exhaust fuel gas supply line 45, whereby the gas turbine 11 can operate normally.

Note that in FIG. 2, in a period between the times t6 and t8, a decrement of the supply flow rate of the fuel gas L1 and an increment of the supply flow rate of the fuel gas L2 equal out, and the decrement or the increment thereof is denoted as a fuel gas ΔL. In this embodiment, by supplying the fuel gas ΔL to the SOFC 13, in the rated state, the fuel utilization rate of the SOFC 13 becomes less than 65%, and more preferably, the fuel utilization rate becomes in a range of 30 to 60%.

Note that the method for starting the power generation system according to this embodiment is not limited to the above-described method. It is also possible to partially change the starting method illustrated in FIG. 2 such that start of supply of the fuel gas and the steam at the predetermined power generation chamber temperature T1, which is before reaching the predetermined power generation chamber temperature T3. As illustrated in FIG. 3, at time t14, supply of the fuel gas L2 to the anode of the SOFC 13 is started before the temperature of the power generation chamber of the SOFC 13 reaches a predetermined power generation chamber temperature T1, and by time t15, the supply flow rate of the fuel gas L2 is fixed.

Furthermore, at the time t14, such that the supply flow rate of the steam S1 to the anode of the SOFC 13 becomes a predetermined value, supply of the steam S1 to the anode of the SOFC 13 is started before the time t14. Then, in the SOFC 13, the fuel gas L2 is appropriately reformed by the steam S1 as the steam S1 is supplied to the fuel gas L2.

At the time t15, since the temperature of the power generation chamber of the SOFC 13 reaches the predetermined power generation chamber temperature T2, the supply flow rate of the fuel gas L2 to the anode of the SOFC 13 is increased at a predetermined (fixed) rate of change. Furthermore, at the time t15, corresponding to the increment of the fuel gas L2 supplied to the anode of the SOFC 13, the supply flow rate of the fuel gas L1 supplied to the combustor 22 of the gas turbine 11 is decreased, and the supply flow rate of the fuel gas L1 is decreased at a predetermined (fixed) rate of change.

At time t16, when the temperature of the power generation chamber reaches the predetermined power generation chamber temperature T3 set in advance, the supply flow rate of the fuel gas L2 to the anode of the SOFC 13 is further increased at a predetermined (fixed) rate of change, which is larger than the rate of change so far. Furthermore, at the time t16, corresponding to the increment of the fuel gas L2 supplied to the anode of the SOFC 13, the supply flow rate of the fuel gas L1 supplied to the combustor 22 of the gas turbine 11 is decreased at a predetermined (fixed) rate of change, which is larger than the rate of change so far.

At time t17, the supply flow rate of the fuel gas L2 supplied to the anode of the SOFC 13 reaches a predetermined supply flow rate, whereby the supply flow rate of the steam S1 supplied to the anode is increased. A timing to supply the steam S1 to the anode is decided by the theoretical mixture ratio, or the S/C ratio, between the steam S1 and carbon monoxide in the anode. When the theoretical mixture ratio, or the S/C ratio=4 or above, the supply flow rate of the steam S1 supplied to the anode is increased. Then, at time t18, the supply flow rate of the fuel gas L2 supplied to the anode of the SOFC 13 is set to 100%, and the supply flow rate of the fuel gas L1 supplied to the combustor 22 is set to 0%.

In FIG. 3, it is possible to start the power generation system by starting supply of the fuel gas and the steam before reaching the power generation chamber temperature T1 (300° C.) at which reforming of the fuel gas in the fuel cell 13 becomes possible. Accordingly, by using reforming of the fuel gas in the fuel cell 13 for maintaining the anode in a reducing atmosphere, it is possible to realize a method for starting the fuel cell 13 while securing reliability thereof.

Furthermore, it is also possible to partially change the starting method illustrated in FIG. 2, and to change the time of starting supply of the steam S1. That is, as illustrated in FIG. 4, since at time t25, the temperature of the power generation chamber of the SOFC 13 reaches the predetermined power generation chamber temperature T2, supply of the fuel gas L2 to the anode of the SOFC 13 is started, and the supply flow rate of the fuel gas L2 is increased at a predetermined (fixed) rate of change. Then, the load (power generation amount) of the SOFC 13 is increased as the fuel gas L2 is supplied to the SOFC 13. Furthermore, at the time t25, corresponding to the increment of the fuel gas L2 supplied to the anode of the SOFC 13, the supply flow rate of the fuel gas L1 supplied to the combustor 22 of the gas turbine 11 is decreased at a predetermined (fixed) rate of change. In this case, a total flow rate of the supply flow rate of the fuel gas L2 to the anode and the supply flow rate of the fuel gas L1 to the combustor 22 is always fixed.

Furthermore, at the time t25, such that the supply flow rate of the steam S1 to the anode of the SOFC 13 becomes the supply flow rate of the steam S1 required for internal reforming relative to the fuel gas L2 at time t27 during the rated operation, the supply of the steam S1 to the anode of the SOFC 13 is started before the time t25.

Furthermore, it is also possible to partially change the starting method illustrated in FIG. 3, and to change the time of starting supply of the steam S1. That is, as illustrated in FIG. 5, since at time t34, before a temperature of the power generation chamber of the SOFC 13 reaches the predetermined power generation chamber temperature T1, the supply of the fuel gas L2 to the anode of the SOFC 13 is started, and the supply flow rate of the fuel gas L2 is fixed up to time t35.

Furthermore, the supply of the steam S1 to the anode of the SOFC 13 is started before the time t34, such that the supply flow rate of the steam S1 to the anode of the SOFC 13 at the time t34 becomes the supply flow rate of the steam S1 required for internal reforming relative to the fuel gas L2 at time t37 during the rated operation.

In FIGS. 4 and 5, the supply flow rate of the steam S1 is set to be a supply flow rate capable of maintaining the theoretical mixture ratio S/C=4 or above based on the supply flow rate of the fuel gas L2 during the rated operation.

REFERENCE SIGNS LIST 10 power generation system
11 gas turbine
12 power generator
13 solid oxide fuel cell (SOFC)
14 steam turbine
15 power generator
21 compressor
22 combustor
23 turbine
26 first compression air supply line (first compression oxidant supply line)
27 first fuel gas supply line
28 control valve (fuel gas supply ratio change unit)
31 second compression air supply line (second compression oxidant supply line)
32 control valve
33 blower 34 exhaust air line
36 exhaust air supply line (exhaust oxidant supply line)
38 control valve
39 heat exchanger
41 second fuel gas supply line
42 control valve (fuel gas supply ratio change unit)
43 exhaust fuel line
45 exhaust fuel gas supply line
47 control valve
48 blower
49 fuel gas recirculation line
50 control valve
51 blower
61 exhausted heat recovery boiler
63 steam supply line
71 steam supply line
72 control valve (steam supply flow rate adjusting unit)
81 controller (control unit)
82 first pressure detector
83 second pressure detector
84 power generation chamber temperature detector
85 exhaust air temperature detector (exhaust oxidant temperature detector)
86 first fuel gas supply line flow meter
87 second fuel gas supply line flow meter
88 steam supply line flow meter
89 fuel gas recirculation line flow meter

The invention claimed is:

1. A power generation system comprising:
   a gas turbine having a compressor and a combustor;
   a fuel cell having a cathode and an anode;
   a first compression oxidant supply line configured to supply a compression oxidant compressed in the compressor to the combustor;
   a second compression oxidant supply line configured to supply at least a part of the compression oxidant compressed in the compressor to the cathode;
   an exhaust oxidant supply line configured to supply an exhaust oxidant discharged from the cathode to the combustor;
   a first fuel gas supply line configured to supply a fuel gas to the combustor;
   a second fuel gas supply line configured to supply the fuel gas to the anode;
   a fuel gas supply ratio change unit capable of changing a supply ratio between the fuel gas supplied to the combustor and the fuel gas supplied to the anode;
   an exhaust fuel gas supply line configured to supply an exhaust fuel gas discharged from the anode to the combustor; and
   a control unit configured to control the fuel gas supply ratio change unit in accordance with a temperature of the fuel cell, wherein
   the fuel cell is provided with a power generation chamber temperature detector configured to detect a temperature of a power generation chamber of the fuel cell, and
   before the fuel cell completes start-up, the control unit performs control of decreasing a fuel gas flow rate supplied to the combustor by $\Delta L$ and of increasing a fuel gas flow rate supplied to the anode by $\Delta L$ by the fuel gas supply ratio change unit.

2. The power generation system according to claim 1, further comprising:
   a steam supply line configured to supply steam to the anode; and a steam supply flow rate adjusting unit configured to adjust a supply flow rate of the steam supplied to the anode, wherein
   the steam supply flow rate adjusting unit increases the supply flow rate of the steam supplied to the anode, before the control of increasing the fuel gas flow rate supplied to the anode by $\Delta L$ is completed.

3. The power generation system according to claim 2, further comprising an exhausted heat recovery boiler configured to generate steam from a flue gas from the gas turbine, wherein the steam supply line is connected to the exhausted heat recovery boiler at one end thereof, and connected to the anode at the other end thereof.

* * * * *